United States Patent
Weicker (10) Patent No.: US 10,597,035 B2
(45) Date of Patent: Mar. 24, 2020

(54) SYSTEMS AND METHODS FOR INTELLIGENTLY CONTROLLING AND DISENGAGING VEHICLE CREEP

(71) Applicant: Faraday&Future Inc., Gardena, CA (US)

(72) Inventor: Phillip John Weicker, Los Angeles, CA (US)

(73) Assignee: FARADAY & FUTURE INC., Gardena, CA (US)

( * ) Notice: Subject to any disclaimer, the term of this patent is extended or adjusted under 35 U.S.C. 154(b) by 0 days.

(21) Appl. No.: 15/662,651

(22) Filed: Jul. 28, 2017

(65) Prior Publication Data

US 2018/0281801 A1    Oct. 4, 2018

Related U.S. Application Data

(60) Provisional application No. 62/368,958, filed on Jul. 29, 2016.

(51) Int. Cl.
*B60W 30/18* (2012.01)
*B60N 2/00* (2006.01)
*G06K 9/00* (2006.01)

(52) U.S. Cl.
CPC ....... *B60W 30/18063* (2013.01); *B60N 2/002* (2013.01); *G06K 9/00838* (2013.01)

(58) Field of Classification Search
None
See application file for complete search history.

(56) References Cited

U.S. PATENT DOCUMENTS

| | | | | |
|---|---|---|---|---|
| 5,681,242 A | * | 10/1997 | Bates | B60W 10/02 477/180 |
| 8,457,838 B1 | * | 6/2013 | Fear | B60K 35/00 701/1 |
| 2013/0288855 A1 | * | 10/2013 | Monsere | B60L 15/2045 477/24 |
| 2015/0375731 A1 | * | 12/2015 | Grover, Jr. | B60W 10/18 701/70 |

* cited by examiner

*Primary Examiner* — Tamara L Weber
(74) *Attorney, Agent, or Firm* — Veros Legal Solutions, LLP (57) ABSTRACT

A system for intelligently disengaging vehicle creep, the system comprising one or more sensors configured to be operatively coupled with a vehicle, one or more processors configured to execute machine-readable instructions to obtain information from one or more of the sensors, compare obtained information with reference information, determine whether a creep disengaging condition has been satisfied based on the obtained information and the reference information, and disengage a creep function of the vehicle if it is determined that a creep disengaging condition has been satisfied. In some embodiments, the system disengages a vehicle's creep functionality when it is determined that the driver has exited the vehicle.

21 Claims, 3 Drawing Sheets

SYSTEMS AND METHODS FOR INTELLIGENTLY CONTROLLING AND DISENGAGING VEHICLE CREEP

CROSS-REFERENCE TO RELATED APPLICATIONS

This application claims the benefit of U.S. Provisional Application No. 62/368,958, filed Jul. 29, 2016, the entirety of which is hereby incorporated by reference.

TECHNICAL FIELD

The present disclosure relates to systems and methods for intelligently disengaging a vehicle's creep functionality to prevent the vehicle from gradually moving forward or backward under certain circumstances.

BACKGROUND OF THE DISCLOSURE

Vehicles are often configured to slowly move forward (or, backward, when in reverse) as the driver releases the break but the car is still powered on and/or in gear. Creep is the term used to describe the slow forward movement. Vehicles with internal combustion engines and automatic transmissions have been made to creep for years, and more recently electric vehicles have also been configured to display creep. In some instances, creep is desirable, in other instances it is not. Currently, electric vehicles and other vehicle lack the ability to automatically and intelligently engage or disengage creep functionality at desirable times or in desirable circumstances. In view of these drawbacks, there exists a long-felt need for systems and methods that intelligently engage or disengage creep functionality in vehicles at desirable times and/or in desirable circumstances.

BRIEF SUMMARY OF THE DISCLOSURE

The disclosed systems and methods enhance the safety and security of vehicles. The disclosed systems and methods may mitigate or overcome one or more of the problems set forth above and/or other problems in the prior art.

Some embodiments of the present disclosure are directed toward systems and methods for preventing a vehicle from undesirably rolling away (forward or backward) on account of creep. The system may comprise one or more sensor(s) configured to be operatively coupled with one or more of a vehicle structure and/or vehicle system; one or more physical computer processors configured by computer readable instructions to: obtain information from one or more of the sensor(s), compare the information obtained with reference information, determine whether a creep disengaging condition has been satisfied; and disengage creep functionality of a vehicle if it is determined that a creep disengaging condition has been satisfied.

The sensor(s) can be any type of sensor(s). In some embodiments, the sensor(s) may include one or more of a pressure sensor, a camera, a force sensor, a temperature sensor, a heat sensor, a proximity sensor, a chemical sensor, a light sensor, a near field communication (NFC) sensor, a biometric sensor, radio frequency (RF) sensor, a motion sensor, a safety-belt sensor, and/or a sound sensor. In some embodiments, one or more sensors are coupled a vehicle to determine if a person is inside the vehicle, if a person is sitting on the driver's seat of the vehicle, the identity of the person, if the person in the driver's seat is a child or an adult, if one or more of the vehicles systems are not in a driving condition or arrangement (e.g. a door is ajar, the car battery is low, etc.).

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments consistent with the present invention do not represent all implementations consistent with the invention. Instead, they are merely examples of systems and methods consistent with aspects related to the invention.

Figure 1:
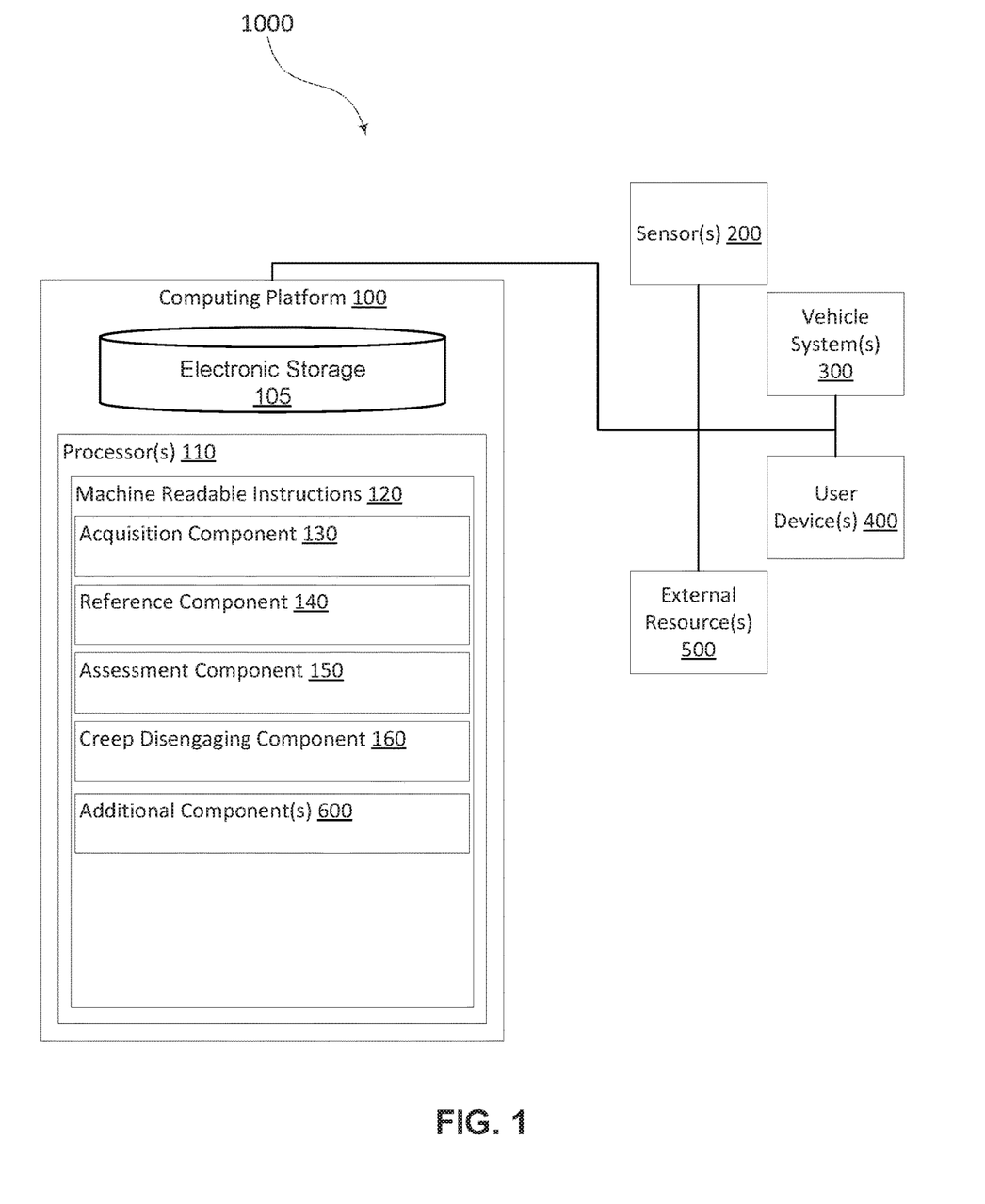
FIG. 1 illustrates a creep disengaging system in accordance with one or more embodiments of the present technology.

FIG. 1 illustrates a creep disengaging system in accordance with one or more embodiments of the present technology. As shown, creep disengaging system 1000 may include, computing platform(s) 100, one or more sensor(s) 200, vehicle system(s) 300—any one or more of which may be operatively coupled with any other.

Sensor(s) 200 may include any one or more sensors of any type or size. Sensors may be configured to detect events or changes in the nearby environment (e.g. the environment of a vehicle with which they are coupled), and to provide a corresponding output. Sensor(s) may include any type of transducer(s), including any transducers commonly known in the art, and may provide various types of output (e.g. electrical or optical signals). By way of non-limiting example, in some embodiments the sensor(s) include one or more of a pressure sensor, a camera, a weight/load sensor, a temperature sensor, a heat sensor, a proximity sensor, a chemical sensor, a light sensor, an NFC sensor (e.g. RFID sensor), a biometric sensor (e.g. fingerprint, facial recognition), a motion sensor, a radio frequency (RF) sensor, a safety-belt sensor, and/or a sound sensor. Sensor(s) 200 may be configured to be embedded in or operatively coupled with a vehicle, as well as with any one or more other elements of creep disengaging system 1000. For instance, sensor(s) 200 may be operatively coupled with computing platform 100, and client computing platform may obtain and operate on information from such sensor(s) 200 to effectuate one or more features of the present technology.

Computing platform 100 may include electronic storage 105 and one or more physical processor(s) 110 configured to execute machine-readable instructions 120. As shown, in some embodiments, machine-readable instructions 120 may include one or more computer program components such as acquisition component 130, reference component 140, assessment component 150, creep disengaging component 160, and/or one or more additional component(s) 600.

Acquisition component 130 of system 1000 may be configured to obtain information from one or more of the sensor(s) 200. Such information may include, by way of example, a pressure measure, a weight/mass measure, a force or load measure, a temperature or heat measure, a proximity measure, an chemical content measure (e.g. $CO_2$ quantity in surrounding air), a photon intensity measure, a sound or electromagnetic frequency measure (e.g. IR frequency measure), a biometric measure, a motion measure, and/or any other measure that represents a physical characteristic or change in or near the environment of the sensor(s) 200 (e.g. whether detecting a feature or condition of the car, the car's interior, the environment outside or inside the car, a user of the car, or any characteristic of either). Acquisition component 130 may receive information from one or more of the sensor(s) 200 through any communication medium, including any already known in the art. For example, sensor(s) 200 may be operatively coupled to computing platform 100 via a hard-wire connection (e.g. a coaxial cable, a wire, etc.), a wireless connection (e.g. via Bluetooth protocols, Wi-Fi, Internet protocols, ZigBee protocols, etc.), and/or any other communications medium. One of ordinary skill in the art will recognize that, although not shown, any one or more of the elements of system 1000 may be equipped with (or otherwise coupled to) one or more transmitters, receivers, transceivers, modulators, demodulators, modems, etc. configured to facilitate such communication. Acquisition component 130 may be configured to store any one or more bits or units or measures of information obtained or otherwise received from the one or more sensors 200, and/or to generate and/or store a representation of the information obtained or otherwise received from the one or more sensors 200. For example, acquisition component 130 may store data in/as a database in electronic storage 105, the data representing information obtained from a sensor 200 such as a temperature measure from a thermodetector sensor. It should be noted that acquisition component 130 may be configured to actively, iteratively, and/or continuously retrieve or request sensory information from sensors 200. In some embodiments acquisition component 130 receives a real-time or near real-time feed of sensory information from one or more of the one or more sensor(s) 200 operatively coupled therewith.

Reference component 140 of system 1000 may be configured to receive, store, create, and/or update reference information reflecting data points or other information useful for assessing the one or more bits of the information obtained from sensor(s) 200. Reference information may include one or more data points or other information that relate to the same type of information obtained by acquisition component 130 (e.g. via sensor(s) 200), but reflect a controlled or otherwise predefined condition. For example, reference information may include a table that includes the following:

TABLE 1.0

| | Metric | Value |
|---|---|---|
| 1 | FL Tire Pressure (vacant) | 45 psi |
| 2 | FR Tire Pressure (vacant) | 42 psi |
| 3 | BL Tire Pressure (vacant) | 45 psi |
| 4 | BR Tire Pressure (vacant) | 41 psi |
| 5 | FL Seat Load (empty) | 2 lbs |
| 6 | FR Seat Load (empty) | 2 lbs |
| 7 | BR Seat Load (empty) | 2 lbs |
| 8 | BL Seat Load (empty) | 2 lbs |
| 9 | RFID signal frequency | 127 kHz |
| 10 | FL Seat juncture light | [Current Photon Intensity] |
| 11 | FL Seatbelt Sensor | [Current Seatbelt Position] |
| 12 | . . . | |

As shown by way of a non-limiting example in Table 1.0 above, the information received, stored, created, and/or updated by reference component 140 may include any conditions about the vehicle or the vehicles surrounding environment under any one or more conditions. In some embodiments, the reference information details information about the vehicle of the vehicles surrounding environment when the vehicle is not in use. For example, row 1 in Table 1.0 includes a tire pressure value for the front left tire of a vehicle when the vehicle is vacant (i.e. contains no occupants), row 2 provides the same information for the front right tire, and so on. Row 5 in Table 1.0 includes a load or force reading when there is no human sitting in the front-left seat (e.g. a driver's seat), and so on. It should be noted that the reference information can include any information, and in many instances will include much more detailed information than shown in Table 1.0. One of ordinary skill in the art will appreciate that any such information, or combination of such information, may be utilized as reference information without departing from the scope and spirit of the systems and methods disclosed herein. Further, in some embodiments, reference component may be configured to calibrate the values or other information stored thereby. For example, reference component 140 may be configured to initiate an acquisition of sensory information (e.g. via acquisition component 130) during a period of typical nonuse (e.g. in the middle of the night, when the vehicle is plugged in, etc.). Based on the information received, reference component 130 may update a previously stored or previously unavailable information (e.g. it may change the value associated with FR Tire pressure (vacant) to 40 psi down from 42 psi). Accordingly, in some embodiments, the reference information is dynamic, and may in some instances be automatically updated. In other embodiments, reference information is static (i.e. it does not change). In some embodiments, reference information is predefined by a supplier, manufacturer, user, or other third party who may input appropriate values into system 1000 (e.g. stored in a database in electronic storage 105 accessible via reference component 140) such that the values are preset. In some embodiments, such preset values may not be modified by a user, and/or are not otherwise updated. For example, a system 1000 in accordance with the present technology may come with predefined values.

Assessment component 150 of system 1000 may be configured to compare the information obtained by acquisition component 130 from sensor(s) 200 with one or more units or bits of reference information. In some instances, assessment component 150 may receive, store, create, and/or define one or more of a rule, a threshold, a template, a chart, a pattern and/or a profile that describes or defines characteristics, measures or circumstances that are indicative of certain conditions, outcomes, results, and/or affects. In some embodiments, assessment component 150 may make a determination based on a comparison of more current information acquired from sensor(s) 200 as compared to earlier information acquired from sensor(s) 200. In some embodiments assessment component 150 may make a determination based on a comparison of information acquired from sensor(s) 200 as compared to the reference information held or stored by reference component 140. In some embodiments, assessment component 150 may make a determination based on a change identified in sensor information being received, independent of information held by reference component. In some embodiments, assessment component 150 is configured to, based on the comparison, determine whether or not a user (e.g. a person) is inside the vehicle cabin. In some embodiments, assessment component 150 may be configured to determine the identity of a user inside the cabin, what probable type of individual the user is (e.g. a child, an adult, etc.), and/or what the user's role is (e.g. driver, passenger, etc.). In some embodiments, assessment component 150 may be configured to determine the position or configuration of a feature of the vehicle, such as, e.g., whether a door is ajar or is properly shut, whether a seatbelt for given seat is clicked-in, what amount of battery power remains in the car battery, etc. In some embodiments, assessment component 150 is configured to determine an environmental condition (e.g. the outside weather, the temperature inside and outside the vehicle, etc.).

Creep disengaging component 160 of system 1000 may be configured to and disengage creep functionality of a vehicle if it is determined that a creep disengaging condition has been satisfied. Creep disengaging component 160 may be operatively coupled to assessment component 150 to receive the assessment results, store or access the creep disengaging conditions from any accessible storage such as electronic storage 105, and determine whether the creep disengaging conditions are satisfied based on the assessment results. Creep disengaging conditions may be predefined by a supplier, manufacturer, user, or other third party who may input/select appropriate conditions into system 1000 (e.g. stored in a database in electronic storage 105 accessible via creep disengaging component 160 or any other component of the system 1000). For example, a system 1000 in accordance with the present technology may be configured with a preset creep disengaging condition defined such that when there are no occupants in the vehicle, the condition is satisfied. In another example, a system 1000 in accordance with the present technology may be configured with a preset creep disengaging condition defined such that unless a particular occupant is recognized, the condition is satisfied. In another example, a system 1000 in accordance with the present technology may be configured with a preset creep disengaging condition defined such that where the only occupant(s) is/are children or passengers, the condition is satisfied. In another example, a system 1000 in accordance with the present technology may be configured with a preset creep disengaging condition defined such that where any one or more of the vehicle doors, hood, trunk are ajar, the condition is satisfied. One of ordinary skill in the art will appreciate that any condition may defined or preset in connection with system 1000, satisfaction of which may be informed by, based upon, or determined from information from any one or more sensors 200. The creep disengaging conditions may be predefined or present by a user, or learned and updated by system 1000.

Figure 2:
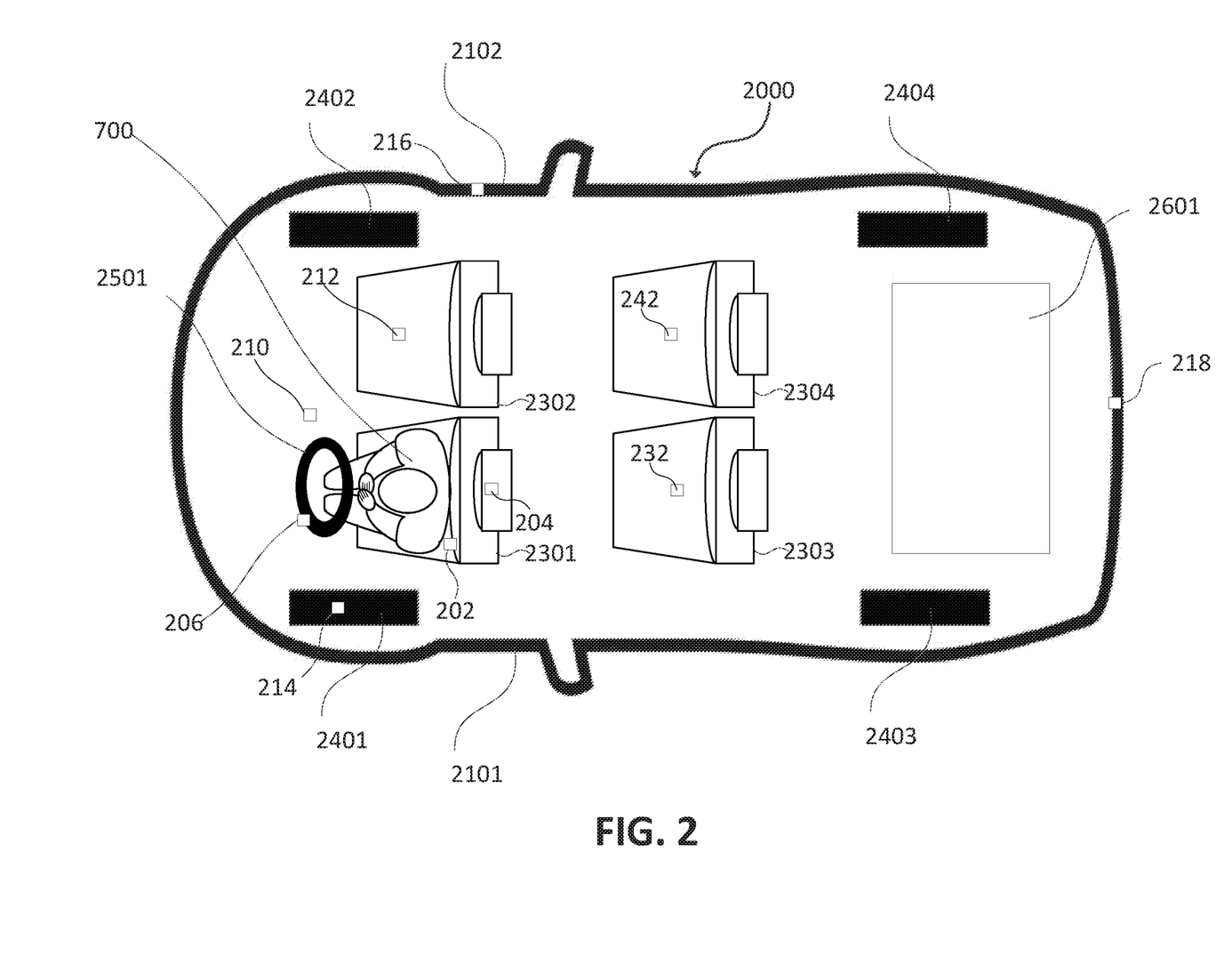
FIG. 2 illustrates an exemplary vehicle that may employ a creep disengaging system in accordance with one or more embodiments of the present technology.

Several non-limiting examples are now discussed in detail with reference to FIG. 2, in conjunction with with FIG. 1. FIG. 2 symbolically illustrates an exemplary vehicle having a creep mechanism with which the systems and methods of the present technology may be implemented. Sensors used in accordance with the present technology may be embedded within and/or otherwise coupled with any part or feature of the vehicle. For example, as shown, a sensor 216 may be coupled with a vehicle door 2101, a sensor 204 may be coupled with the headrest of a vehicle seat 2301, a sensor 202 (or, e.g., sensor 212, 222, 232) may be coupled with a vehicle seat 2301 (or, e.g., seat 2302, 2303, 2304), a sensor 214 may be coupled with a vehicle wheel or tire 2401 (or, e.g., wheel or tire 2402, 2403, 2404), a sensor 206 may be coupled to a steering-wheel 2501, a sensor 218 may be couple with a trunk door, a sensor 210 may be coupled to a dashboard (not shown), and one or more sensors may be coupled to a rear-view mirror (not shown), a center console (not shown), an audio or appliance panel (not shown), a battery 2601, or any other feature to which a sensor may be configured to couple. The sensors may be operatively coupled with computing platform 100, vehicle systems 300, user devices 400, and/or external resources 500 in any manner. In operation, system 1000 may utilize information received from the one or more sensors to disable or otherwise disengage the creep functionality at a desirable time.

In some embodiments, the systems and methods of the present technology disengage vehicle creep functionality based on whether or not there is a driver occupant in the vehicle. For instance, when a driver 700 may wish to exit vehicle 2000 temporarily to help another passenger into the car. Sensor 202 may be a weight/load sensor, and be in communication with computing platform 100 in accordance with embodiments of the present disclosure. Assessment component 150 of computing platform 100 may receive real-time information from load sensor 202 via acquisition component 130, indicating that the load detected by a sensor in FL Seat (i.e. driver's seat 2301) has just changed from 174 pounds to 2 pounds. Assessment component 150 may promptly compare this value of 2 pounds to the reference information from reference component 140 in connection with driver's seat 2301, and by this comparison determine that there is no longer anything resting on seat 2301. Creep disengaging component 160 may determine, based on a predetermined criteria or condition, that if no load is detected in seat 2301, no driver is controlling the vehicle. Thus, creep disengaging component 160 may communicate with vehicle system(s) 300 to disengage the creep function that is otherwise active. When the creep function is disengaged, the vehicle may enforce "zero" speed, i.e., come into a complete stop, via the computing platform 100. For example, the computing platform 100 may instruct the vehicle system 300 not to engage the motor and/or to apply brakes. In a similar fashion, when sensor 202 detects a new load indicating to system 1000 that a driver has reentered the vehicle and is in the driver's seat 2301, the creep functionality may be reactivated, or otherwise engaged. The systems and methods of the present disclosure thus intelligently control the creep function of the vehicle to avoid safety hazards and other accidents that are undesirable.

In some embodiments, the systems and methods of the present technology disengage vehicle creep functionality when the wrong type of occupant (e.g. a child) is in the driver's seat. For instance, a driver 700 of vehicle 2000 may be taking their children to school but wish to stop at the end of the driveway to quickly get out of the vehicle and get the mail. The driver may properly put the vehicle in "park" mode, then exit the vehicle to get the mail. Because the vehicle is in park, the systems and methods of the present technology need not be engaged to prevent forward or backward creep. However, while the driver is out collecting his/her mails, one of his/her children climbs out of his/her seat and into the driver's seat, and puts the vehicle in a driving gear/mode. Assessment component 150 of computing platform 100 may receive real-time information from load sensor 202 via acquisition component 130, indicating that the load detected by a sensor in FL Seat (i.e. driver's seat 2301) is 45 pounds. Assessment component 150 may promptly compare this value of 45 pounds to the reference information from reference component 140 in connection with driver's seat 2301, and by this comparison determine that there is a load resting in the driver's seat 2301. However, creep disengaging component 160 may determine, based on a predetermined criteria or condition, that if the load sensed in connection with an occupant in seat 2301 is under 90 pounds, the occupant is not a "driver" occupant.

Thus, recognizing that a creep disengaging condition or criteria has been satisfied, creep disengaging component 160 may communicate with vehicle system(s) 300 to disengage the creep function of the vehicle until an appropriate driver "type" is detected in the vehicle.

In some embodiments, the systems and methods of the present technology disengage vehicle creep functionality based on the identity of the driver (in accordance with a predefined driver profile). In another example, a vehicle 2000 may be shared by two different drivers, a husband and wife, for example. The wife may generally have a preference for vehicle to creep forward on its own when she takes her foot off the break because she is often in stop-and-go traffic, and the creep functionality is quite convenient. The husband may generally have a preference for no vehicle creep because he is always picking up or dropping off the couple's children at school, sports practices, friend's houses, etc., and he feels that the creep functionality is too dangerous when children are in the vicinity. Vehicle 2000 may be equipped with a sensor 210, such as a camera, mounted on the dashboard or rear mirror of the vehicle. Assessment component 150 may receive real-time or near real-time image information from the camera sensor(s) 210 via acquisition component 130. Assessment component 150 may promptly compare the image information with image data already stored, held, or otherwise accessible via reference component 140 and determine (e.g. via automated facial recognition) that it matches or substantially matches one or more image data in the reference information database. Creep disengaging component 160 may determine, based on the information gleaned from assessment component 150, that the match identified by assessment component 150 is related to the husband's driver profile (predefined information), and thus, a creep disengaging criteria has been satisfied (e.g., if husband driving, then disengage creep) and creep disengaging component 160 may communicate with vehicle system(s) 300 to disengage the creep function that may otherwise active. The systems and methods of the present disclosure thus intelligently control the creep function of the vehicle to avoid safety hazards and other accidents that are undesirable.

In some embodiments, the systems and methods of the present technology disengage vehicle creep functionality based on a detection or determination as to whether other vehicle systems 300 or features are in a position or configuration that comport with driving. For instance, a load sensor 202 may detect that a driver 700 is properly inside the vehicle, but at the same time a door sensor 216 at passengers side door 2102 may detect that the passenger door 2102 is ajar or otherwise open. Assessment component 150 may receive real-time or near real-time information from both sensor(s) 202 and 216 via acquisition component 130. Assessment component 150 may promptly compare the load information from sensor 202, and door positioning information from sensor 216 (e.g. a light sensor that detects more light when the door is open than when shut), and compare that information with information already stored, held, or otherwise accessible via reference component 140 and determine, by comparison, that there is a load resting in seat 2301 and that the door sensor 216 is detecting more light than the amount generally detected when the door is closed. Creep disengaging component 160 may determine, based on the information gleaned from assessment component 150, that the load identified by assessment component 150 is indicative of a driver being in the driver's seat, and that the amount of light identified by assessment component 150 (via sensor 216) is indicative of the door 2102 being ajar. Creep disengaging component may utilize this information to determine that a creep disengaging criteria has been satisfied (e.g., if a door is ajar, then disengage creep functionality) and, as such, creep disengaging component 160 may communicate with vehicle system(s) 300 to disengage the creep function that may otherwise active. In some other embodiments, the door sensor 216 may be a motion sensor configured to detect people coming in and out of the vehicle. Whether to disengage creep may be determined based on whether the driver is in the vehicle detected by door sensor 216. The systems and methods of the present disclosure thus intelligently control the creep function of the vehicle to avoid safety hazards and other accidents that are undesirable.

In some embodiments, the system 1000 may determine a user's role and/or location based on a digital signature of the user's mobile device or an ID issued by the vehicle manufacturer that can be stored on the user's mobile device or keyfob. The location of the user's ID may be determined from triangulation of that user's device and, based on that information, the creep disengagement component 160 may disengage (or in some instances engage) the vehicle's creep functionality depending on the characteristics of that user.

In some embodiments, creep disengaging component 160 may make a determination of whether or not to disengage the vehicle's creep functionality based upon information from multiple sensors by prioritizing such information from such sensors. For example, as described in the foregoing example, even though system 1000 detected that a driver was in the driver's seat (a condition that may not cause the system to disengage creep functionality), the creep disengaging component 160 nevertheless made the determination to disengage the creep functionality because it determined that a vehicle door was open (the detected open door being prioritized higher—or at least being more controlling—than the detected driver in the driver's seat, for this instance). Such provides just one example of creep disengaging component 160 making a determination based on priority of information in order to resolve conflicting determinations that may be made based on information gleaned from just a single sensor, for example.

In some embodiments, system 1000 may obtain information from a sensor that one or more of the system components may determine is erroneous, inconsistent, unreliable, or simply inconclusive. System 1000 may be configured to utilize information from multiple sensors, taken together, to inform its determinations and assessments.

Figure 3:
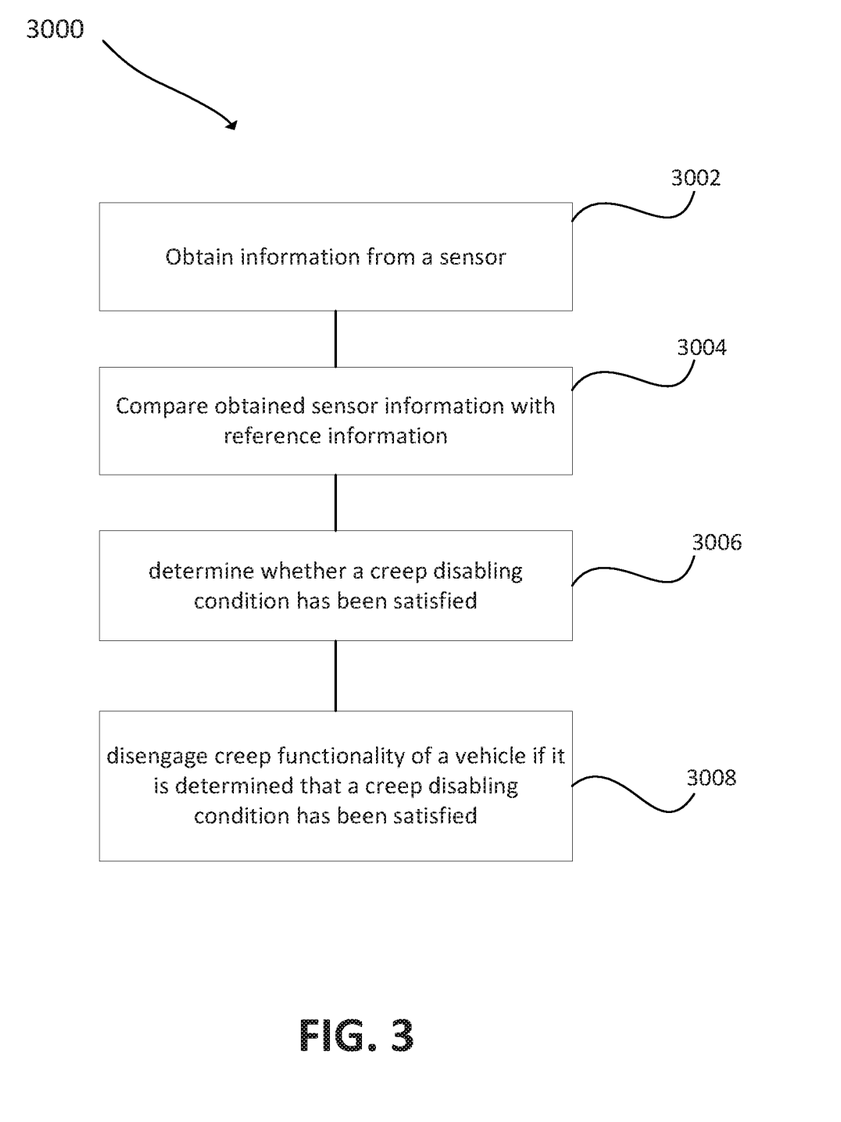
FIG. 3 is a flow chart illustrating a creep disengaging method in accordance with one or more embodiments of the present technology.

FIG. 3 is a flowchart illustrating a method for intelligently controlling vehicle creep in accordance with some embodiments of the present technology. At operation 3002, method 3000 obtains information from one or more sensors. Such sensor(s) may include any type of transducer, including any such transducers commonly known in the art, and may provide various types of output (e.g., electrical or optical signals) that may be obtained at operation 3002 by method 3000. By way of non-limiting example, in some embodiments, the sensor(s) include one or more of a pressure sensor, a camera, a load sensor, a temperature sensor, a heat sensor, a proximity sensor, a chemical sensor, a light sensor, an NFC sensor (e.g. RFID sensor), a biometric sensor (e.g. fingerprint), a motion sensor, and/or a sound sensor. At operation 3004, method 3000 compares obtained sensor information with reference information. Such reference information may include one or more data points or other information that relate to the same type of information obtained by acquisition component 130 (e.g. received from sensor(s) 200). Such reference information may relate to the vehicle itself (e.g. whether a door of the vehicle is open), or it may relate to a particular user (e.g. whether the owner of the vehicle is in the car). At operation 3006, method 3000 utilizes the reference information to determine whether a creep disengaging condition has been satisfied. A creep disengaging condition may be any predefined or preset condition, criteria or rule that describes circumstance(s) when the creep functionality of a vehicle should be disengaged (e.g. when there is no user in the driver's seat but the car is still in gear, the creep functionality should be disengaged.). At operation 3008, method 3000 disengages a creep function of a vehicle if it is determined that a creep disengaging condition has been satisfied.

One of ordinary skill in the art will appreciate that any one or more of the operations carried out by method 3000 (as well as any other methods described herein and variants thereof) may be executed by or in combination with one or more of the components/elements detailed in system 1000 of FIG. 1. One of ordinary skill in the art will also appreciate that any one or more of the capabilities discussed herein with respect to any one of the components/elements detailed in system 1000 of FIG. 1 may be performed by or otherwise configured to be effectuated by a greater or lesser number of components than as described herein, and that in some instances the functionality of two or more components or elements described herein may be carried out by a single component.

The system 1000 may include one or more user devices 400 and/or external resources 500. The user devices 400 and/or external resources 500 may be directly or indirectly connected with computing platform 100. User devices 400 may include any mobile or stationary computing device such as a smartphone, a laptop, a desktop computer, and the like. In some embodiments, the sensors of a mobile phone that is situated in a vehicle may be configured to function as sensor 200. That is, the systems and methods of the present disclosure may utilize mobile or movable sensors that are or become situated within or upon a vehicle. User devices 400 and external resources 500 may be connected to the computing platform 100 via wire connection (e.g., communication bus) or wireless connection.

Reference information, creep disengaging conditions, rules, criteria, and the like, may be inputted into system by any means, including by input via a user device such as a mobile phone. It should further be noted that the reference information and/or the creep disengaging conditions, or any other criteria, rules or schemes that may be desirably employed with the present system may be configured with customization. For example, the creep disengaging conditions may specify which doors being ajar will cause the creep to be disengaged. In another example, the speed and/or acceleration of the creep function may be controlled to increase or decrease based on who is in the car, or what time of day it is, or any other determination or sensory information gleaned from the sensor's and system components of system 1000. In another example, the system 1000 may be configured to disable the vehicle creep functionality if the door adjacent to the predefined location of a child is in an open position. The vehicle systems 300 may also be configured to send an alert to the vehicle owner's phone or send an audible alert over the vehicle's sound system and/or visual system to alert the driver and/or owner if a child's door has been opened. The system 1000, via any one or more components or elements, may send alerts related to any one or more conditions or criteria determined about the car, a user, or the environment, to a user's phone or through the vehicle's sound system.

One of ordinary skill in the art will appreciate that that the technology disclosed herein is not limited to disengaging the creep functionality only. It is equally applicable to engaging creep functionality in an intelligent manner as well. Any and all of the components described herein may be configured and used for such purposes.

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

A person skilled in the art will appreciate that various exemplary logic blocks, components, modules, circuits, schemes, and algorithm steps described with reference to the disclosure herein may be implemented as specialized electronic hardware, computer software, or a combination of electronic hardware and computer software. For examples, the components/units may be implemented by one or more processors to cause the one or more processors to become one or more special purpose processors to executing software instructions stored in the computer-readable storage medium to perform the specialized functions of the components/units.

The flowcharts and block diagrams in the accompanying drawings show system architectures, functions, and operations of possible implementations of the system and method according to multiple embodiments of the present invention. In this regard, each block in the flowchart or block diagram may represent one component, module, one program segment, or a part of code, where the component, module, the program segment, or the part of code includes one or more executable instructions used for implementing specified logic functions. It should also be noted that, in some alternative implementations, functions marked in the blocks may also occur in a sequence different from the sequence marked in the drawing. For example, two consecutive blocks actually can be executed in parallel substantially, and sometimes, they can also be executed in reverse order, which depends on the functions involved. Each block in the block diagram and/or flowchart, and a combination of blocks in the block diagram and/or flowchart, may be implemented by a dedicated hardware-based system for executing corresponding functions or operations, or may be implemented by a combination of dedicated hardware and computer instructions.

As will be understood by those skilled in the art, embodiments of the present disclosure may be embodied as a method, a system or a computer program product. Accordingly, embodiments of the present disclosure may take the form of an entirely hardware embodiment, an entirely software embodiment or an embodiment combining software and hardware for allowing specialized components to perform the functions described above. Furthermore, embodiments of the present disclosure may take the form of a computer program product embodied in one or more tangible and/or non-transitory computer-readable storage media containing computer-readable program codes. Common forms of non-transitory computer readable storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same.

Embodiments of the present disclosure are described with reference to flow diagrams and/or block diagrams of methods, devices (systems), and computer program products according to embodiments of the present disclosure. It will be understood that each flow and/or block of the flow diagrams and/or block diagrams, and combinations of flows and/or blocks in the flow diagrams and/or block diagrams, can be implemented by computer program instructions. These computer program instructions may be provided to a processor of a computer, an embedded processor, or other programmable data processing devices to produce a special purpose machine, such that the instructions, which are executed via the processor of the computer or other programmable data processing devices, create a means for implementing the functions specified in one or more flows in the flow diagrams and/or one or more blocks in the block diagrams.

These computer program instructions may also be stored in a computer-readable memory that can direct a computer or other programmable data processing devices to function in a particular manner, such that the instructions stored in the computer-readable memory produce a manufactured product including an instruction means that implements the functions specified in one or more flows in the flow diagrams and/or one or more blocks in the block diagrams.

These computer program instructions may also be loaded onto a computer or other programmable data processing devices to cause a series of operational steps to be performed on the computer or other programmable devices to produce processing implemented by the computer, such that the instructions (which are executed on the computer or other programmable devices) provide steps for implementing the functions specified in one or more flows in the flow diagrams and/or one or more blocks in the block diagrams. In a typical configuration, a computer device includes one or more Central Processing Units (CPUs), an input/output interface, a network interface, and a memory. The memory may include forms of a volatile memory, a random access memory (RAM), and/or non-volatile memory and the like, such as a read-only memory (ROM) or a flash RAM in a computer-readable storage medium. The memory is an example of the computer-readable storage medium.

The computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The computer-readable medium includes non-volatile and volatile media, and removable and non-removable media, wherein information storage can be implemented with any method or technology. Information may be modules or components of computer-readable instructions, data structures and programs, or other data. Examples of a non-transitory computer-readable medium include but are not limited to a phase-change random access memory (PRAM), a static random access memory (SRAM), a dynamic random access memory (DRAM), other types of random access memories (RAMs), a read-only memory (ROM), an electrically erasable programmable read-only memory (EEPROM), a flash memory or other memory technologies, a compact disc read-only memory (CD-ROM), a digital versatile disc (DVD) or other optical storage, a cassette tape, tape or disk storage or other magnetic storage devices, a cache, a register, or any other non-transmission media that may be used to store information capable of being accessed by a computer device. The computer-readable storage medium is non-transitory, and does not include transitory media, such as modulated data signals and carrier waves.

The specification has described methods, apparatus, and systems for intelligently disengaging a vehicle's creep functionality to prevent the vehicle from gradually moving forward or backward under certain circumstances. The illustrated apparatus, systems, and steps are set out to explain the exemplary embodiments shown and/or desired, and it should be anticipated that ongoing technological development will change the manner in which particular functions are performed. Thus, these examples are presented herein for purposes of illustration, and not limitation. For example, steps or processes disclosed herein are not limited to being performed in the order described, but may be performed in any order, and some steps may be omitted, consistent with the disclosed embodiments. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

It will be appreciated that the present invention is not limited to the exact construction that has been described above and illustrated in the accompanying drawings, and that various modifications and changes can be made without departing from the scope thereof. It is intended that the scope of the invention should only be limited by the appended claims.

I claim:

1. A system for intelligently controlling a vehicle creep function of a vehicle, the system comprising:
   one or more sensors configured to be operatively coupled with the vehicle;
   one or more processors on the vehicle and configured to execute machine-readable instructions to:
   obtain information from one or more of the sensors;
   compare obtained information with reference information, the reference information including a predetermined driver profile;
   determine whether a creep disengaging condition has been satisfied based on the comparison result, including determining that a person on a driver seat of the vehicle is related to the driver profile, and determining that a creep disengaging condition has been satisfied if the driver profile indicates a preference to disengage the creep function of the vehicle;

disengage the creep function of the vehicle if it is determined that a creep disengaging condition has been satisfied.

2. The system of claim 1, wherein the one or more sensors include one or more of the following: a pressure sensor, a camera, a force sensor, a temperature sensor, a heat sensor, a proximity sensor, a chemical sensor, a light sensor, a near field communication (NFC) sensor, a radio frequency (RF) sensor, a biometric sensor, a motion sensor, or a sound sensor.

3. The system of claim 1, wherein the one or more sensors include a load sensor on a driver seat of the vehicle.

4. The system of claim 1, wherein the one or more sensors include a motion sensor on a vehicle door.

5. The system of claim 1, wherein the one or more sensors include a camera coupled to a vehicle rear-view mirror.

6. The system of claim 1, wherein the one or more sensors include a sensor coupled to a vehicle safety-belt.

7. The system of claim 1, wherein to determine whether a creep disengaging condition has been satisfied includes to determine if a person is in a driver seat of the vehicle.

8. The system of claim 1, wherein to determine whether a creep disengaging condition has been satisfied includes to determine if a person in a driver seat of the vehicle is a child.

9. The system of claim 1, wherein to determine whether a creep disengaging condition has been satisfied includes to determine if a person is in the vehicle.

10. The system of claim 1, wherein to determine whether a creep disengaging condition has been satisfied includes to determine an identity of the person on the driver seat of the vehicle.

11. The system of claim 1, wherein to determine whether a creep disengaging condition has been satisfied includes to determine that a creep disengaging condition has not been satisfied if the driver profile indicates a preferred non-zero speed of the creep function of the vehicle; and the machine-readable instructions further include instructions to control the speed of the creep function of the vehicle based on the preferred non-zero speed indicated in the driver profile.

12. A method for intelligently controlling a vehicle creep function of a vehicle, comprising:

obtaining information from one or more sensors configured to be operatively coupled with the vehicle;

comparing the obtained information with reference information, the reference information including a predetermined driver profile;

determining whether a creep disengaging condition has been satisfied based on the obtained information and the reference information, including determining that a person on a driver seat of the vehicle is related to the driver profile, and determining that a creep disengaging condition has been satisfied if the driver profile indicates a preference to disengage the creep function of the vehicle;

disengaging the creep function of the vehicle if it is determined that a creep disengaging condition has been satisfied.

13. The method of claim 12, wherein the one or more sensors include one or more of the following: a pressure sensor, a camera, a force sensor, a temperature sensor, a heat sensor, a proximity sensor, a chemical sensor, a light sensor, a near field communication (NFC) sensor, a radio frequency (RF) sensor, a biometric sensor, a motion sensor, or a sound sensor.

14. The method of claim 12, wherein the one or more sensors include a load sensor on a driver seat of the vehicle.

15. The method of claim 12, wherein one or more sensors include a camera coupled to a vehicle rear-view mirror.

16. The method of claim 12, wherein the one or more sensors include a sensor coupled to a vehicle safety-belt.

17. The method of claim 12, wherein determining whether a creep disengaging condition has been satisfied includes determining if a person is in the vehicle.

18. The method of claim 12, wherein determining whether a creep disengaging condition has been satisfied includes determining if a person is in the driver seat of the vehicle.

19. The method of claim 12, wherein determining whether a creep disengaging condition has been satisfied includes determining an identity of the person in the driver seat of the vehicle.

20. The method of claim 12, wherein determining whether a creep disengaging condition has been satisfied includes to determining that a creep disengaging condition has not been satisfied if the driver profile indicates a preferred non-zero speed of the creep function of the vehicle; and wherein the method further comprises controlling the speed of the creep function of the vehicle based on the preferred non-zero speed indicated in the driver profile.

21. A vehicle system comprising:

one or more sensors configured to be operatively coupled with a vehicle;

one or more processors on the vehicle configured to execute machine-readable instructions to:

obtain information from one or more of the sensors;

determine whether a creep disengaging condition has been satisfied based on the obtained information including determining that a person on a driver seat of the vehicle is related to a predetermined driver profile, and determining that a creep disengaging condition has been satisfied if the driver profile indicates a preference to disengage a creep function of the vehicle; and disengage the creep function of the vehicle if it is determined that a creep disengaging condition has been satisfied.

* * * * *